United States Patent
Balacheff et al.

(10) Patent No.: US 9,571,564 B2
(45) Date of Patent: Feb. 14, 2017

(54) NETWORK SYSTEM FOR IMPLEMENTING A CLOUD PLATFORM

(71) Applicant: HEWLETT-PACKARD DEVELOPMENT COMPANY, L.P., Houston, TX (US)

(72) Inventors: Boris Balacheff, Lyons (FR); David Penkler, Claix (FR); Sebastien Bouat, St. Martin d'Uriage (FR); James C. Cooper, Bloomington, IN (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 146 days.

(21) Appl. No.: 14/424,601

(22) PCT Filed: Aug. 16, 2013

(86) PCT No.: PCT/US2013/055355
§ 371 (c)(1),
(2) Date: Feb. 27, 2015

(87) PCT Pub. No.: WO2014/035692
PCT Pub. Date: Mar. 6, 2014

(65) Prior Publication Data
US 2015/0215380 A1    Jul. 30, 2015

Related U.S. Application Data

(63) Continuation-in-part of application No. 13/601,050, filed on Aug. 31, 2012, now Pat. No. 8,935,764.

(51) Int. Cl.
G06F 15/16        (2006.01)
H04L 29/08        (2006.01)
(Continued)

(52) U.S. Cl.
CPC .......... H04L 67/10 (2013.01); H04L 41/5045 (2013.01); H04L 41/5096 (2013.01);
(Continued)

(58) Field of Classification Search
USPC .......................................... 709/223; 717/104
See application file for complete search history.

(56) References Cited

U.S. PATENT DOCUMENTS 9,003,006 B2 * 4/2015 Xia ..................... G06F 9/44505
                                                                709/223
2010/0325710 A1   12/2010 Etchegoyen et al.
(Continued)

FOREIGN PATENT DOCUMENTS

JP        2001-344033        12/2001
JP        2006-268116        10/2006
(Continued)

OTHER PUBLICATIONS

"Experience a Better Cloud with Intelligent Clients"; Intel White Paper; 2011 (month of publication unknown), 2 pages.
(Continued)

Primary Examiner — Quang N Nguyen
(74) Attorney, Agent, or Firm — Boehmert & Boehmert

(57) ABSTRACT

A network system for implementing a cloud platform within a network to which at least one device defining a computing environment for a user has access comprises an application management module, a community management module, and a user enrollment portal. The application management module enables access to an abstract application, wherein the abstract application is associated with a concrete application defining an implementation of the abstract application for the computing environment. The community management module manages a community, wherein the community comprised of at least a user credential and the abstract
(Continued)

application, wherein the community defines at least one of said following: a policy, a management process, and a service, under which the abstract application can be accessed by the user. The user enrollment portal supports an enrollment of the user in the community from the device, and to orchestrate a policy management mechanism to support an enforcement of the policy under which the user has access to the concrete application from the device.

20 Claims, 7 Drawing Sheets

(51) Int. Cl.
*H04L 29/06* (2006.01)
*H04L 12/24* (2006.01)

(52) U.S. Cl.
CPC ............ *H04L 63/101* (2013.01); *H04L 63/20* (2013.01); *H04L 67/42* (2013.01); *H04L 63/08* (2013.01)

(56) References Cited

U.S. PATENT DOCUMENTS

| | | |
|---|---|---|
| 2011/0231899 A1 | 9/2011 | Pulier et al. |
| 2011/0258461 A1 | 10/2011 | Bates |
| 2011/0276885 A1 | 11/2011 | Gibson et al. |
| 2011/0307946 A1 | 12/2011 | Hilerio et al. |
| 2011/0318011 A1 | 12/2011 | Brassil |
| 2012/0005724 A1 | 1/2012 | Lee |
| 2012/0047239 A1 | 2/2012 | Donahue et al. |
| 2012/0047265 A1 | 2/2012 | Agarwala et al. |
| 2012/0110059 A1 | 5/2012 | Nukala et al. |
| 2012/0198512 A1 | 8/2012 | Zhou et al. |
| 2014/0223410 A1* | 8/2014 | Hosono ............... G06F 9/5077 717/104 |

FOREIGN PATENT DOCUMENTS

| | | |
|---|---|---|
| WO | WO-2008050512 | 5/2008 |
| WO | WO-2012100092 | 7/2012 |

OTHER PUBLICATIONS

"VBlockTM Solution for Trusted Multi-tenancy: Technical Overview"; The Virtual Computing Environment Company White Paper; Aug. 2011; 76 pages.
CloudAnalyst: A CloudSim-based Visual Modeller for Analysing Cloud Computing Environments and Applications. Wickremansinghe et al. I EEE(2010) (7 pages).
CloudSim: a toolkit for modeling and simulation of cloud computing environments and evaluation of resource provisioning algorithms. Calheiros et al. Sofw Pract Exper.(2011) (28 pages).
HASBE: A Hierarchical Attribute-Based Solution for Flexible and Scalable Access Control in Cloud Computing. Wan et al. IEEE(Apr. 2, 2012) (12 pages).
PCT; "Notification of Transmittal of the International Search Report and The Written Oi'nion of the International Searching Authority, or the Declaration"; cited in PCT/US2013/055355; mailed Dec. 30, 2013; 11 pages.
Virtual Machine Contracts for Datacenter and Cloud Computing Environment. Matthews, et al. ACDC (2009) (6 pages).
EPO; European Search Report; 13832360.5-1862 I 2891073 PCT/US2013055355; Mailed Apr. 1, 2016; 7 pages.
JP Office Action; Application No. 2015529849; Mailed May 10, 2016; 6 pages.

* cited by examiner

NETWORK SYSTEM FOR IMPLEMENTING A CLOUD PLATFORM

CROSS-REFERENCE TO RELATED APPLICATION

This application is a national stage application under 35 U.S.C. §371 of PCT/US2013/055355, filed 16 Aug. 2013, which claims priority from U.S. application Ser. No. 13/601,050, filed 31 Aug., 2012, U.S. Pat. No. 8,935,764.

BACKGROUND

A cloud infrastructure or cloud platform delivers computing as a service to one or more clients. For example, cloud platform may deliver an infrastructure (e.g. storage media), or provides software or makes particular computing platforms available to the clients. Therefore, by using cloud platforms it becomes possible to delegate setting up and the maintenance of computing systems to an external provider and therewith to increase significantly the efficiency of the IT (information technology) infrastructure.

Therefore, a cloud platform does not merely connect various components as in conventional networks, but provides instead computing services and infrastructures, which are independent of the devices used by the clients (or user). For example, a user may operate in various contexts, wherein in each of them the user may play a different role and have different responsibilities. These different roles might relate to the personal life of the user or the role of a consumer or of a parent or of a family member. On the other hand, in the working lives, a user may act as an employee or a contractor or a customer or supplier. Within these various contexts, the user may use different client devices (personal computers, mobile phones, tablets, etc) or client devices that utilize remote processing capability (e.g. applications hosted on a web site or a virtual machine hosted in a data center). Different computing environments might be installed on the client devices with local processing capabilities (e.g. different operating systems, virtual software environments, Web application, native application, container, BIOS/API, etc) to interact with the cloud platform. This lack of predetermined hardware/software poses a number of problems to be solved.

BRIEF DESCRIPTION OF THE DRAWINGS

The invention shall be described hereafter in further detail with reference to the accompanying drawings, in which.

DETAILED DESCRIPTION

Figure 1:
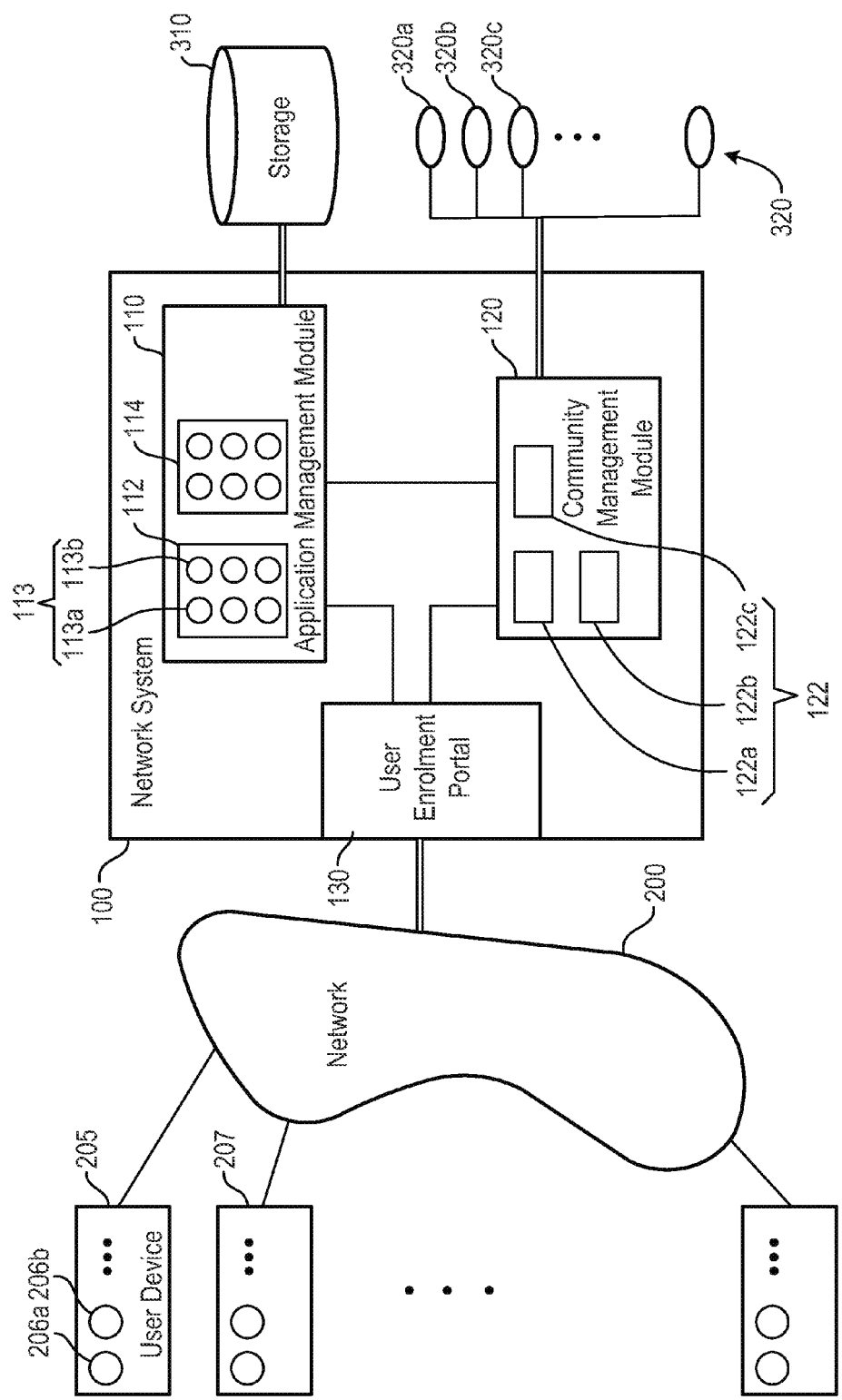
FIG. 1 depicts a network system according to an embodiment of the present invention.

When providing on a cloud platform computing facilities including the respective applications to clients or client devices, which are not part of a commonly managed IT infrastructure, various problems have to be solved to maintain a desired security level to protect, for example, intellectual property of other clients using the cloud platform. In particular, for enterprises and organizations it is important that they are able to manage applications and associated policies which they provide to employees, customers or partners on the various devices with possibly different computing environments used by the clients. At the same time, the enterprises and organizations are under an increased pressure to lower costs in maintaining the computing infrastructure. Thus, there is a need for providing a cloud platform which provides on one hand a high security measure while providing a simple and cost-efficient management for the respective applications provided to the clients in various contexts.

The computing environment defines an interface between a user (or one or more user devices) and the cloud platform and thus relates to an abstract notion in that the computing environment is, in general, not specific for a specific device used by user. However, it may be associated with a particular device that the user uses to connect to the cloud platform, but the same computing environment may likewise be used on various different devices. In addition, a given device may host many different computing environments. Examples for such computing environments are: a Web application (e.g. a browser), a native application, a container, a virtual machine, or BIOS/API. Therefore the computing environment defines the interface through which the user can interact with the cloud platform (network system).

The present invention solves these problems by providing a network system for implementing a cloud platform within a network to which at least one device defining one or more computing environments for one or more users has access. The system comprises an application management module to enable access to one or more abstract applications, each abstract application being associated with one or more concrete applications defining implementations of the abstract application for a particular computing environment. The system further comprises a community management module to manage one or more communities, the one or more communities are comprised of at least one or more user credentials and at least one abstract application. The community defines at least one of the following: one or more policies, one or more management processes, and one or more services, under which the at least one abstract application can be accessed by the one or more users. The system further comprises a user enrolment portal to support an enrolment of the one or more users in the one or more communities from the at least one device, and to orchestrate a policy management mechanism to support an enforcement of the policy under which the user has access to the one or more concrete applications from the at least one device or from the one or more computing environments.

Therefore, embodiments of the present invention provides a decoupling of client device administration and management so that these devices, multiple communities (or IT domains) and applications are managed or administrated separately in a multi-tenant-environment (cloud platform). Such multi-tenancy in cloud environments relates to a structure wherein multiple independent users share a common set of infrastructure, platforms, services/applications, or resources in a manner that isolates them from each other securely. A user may be a company or an organization but may likewise be a private person, and the device may refer to any of a range of end-user client device.

Such a cloud platform provides connectivity to be used, for example, by personal computers, tablets, smart phones, or other end user-connected devices (home entertainment, etc. . . . ). In addition, further examples define decoupled administration models applicable to server blades in a data center or to any distributed connected devices. According to embodiments, resources of a client device can be shared by multiple independent entities or administrators. For example, on a user device a container environment representing a closed software environment protected from other software installed on the device may be installed. The software environment within such container can be managed from the community management module based on applied policies by employing, for example, particular software modules which ensure that the policies are correctly applied. Therefore, each of such containers can be managed by different (community) administrators, whereas the software environment outside these containers may still be managed by the user itself.

Therefore, each of these entities can independently and securely manage and administer its own footprint (e.g. represented by the container environment) on the device (or on the computing environment) in conjunction with the corresponding private or public cloud-based resources. These independent client-side footprints that participate in this multi-tenant client-cloud environment are referred to as the "communities" (as for example, trust domains, policy domains). Hence, such a community is an independent IT administration domain operated by a provider or an administrator (e.g. an individual private user or a group of industry partners).

The management of such a multi-tenant client device may relate to controlling the base operating system and/or firmware, enabling or disabling the device or a device feature (e.g. storing/printing of data). According to embodiments this management is performed from a cloud-based platform and is decoupled or separated from the management of individual communities. This allows, for example, a device manufacture or distributor or communication service provider to offer and operate device management for their customers while providing them with the choice of which communities they wish to manage or be users of. In addition, application providers may manage applications that they offer in various application markets or marts available inside individual communities, as well as the instances of their applications that have been installed within one or more community footprints on end-user devices or in the computing environment. Corporations can manage (authorize use, set security controls) of an application within a community they establish.

Therefore, embodiments relate to a cloud-enabled device architecture and a corresponding cloud-based management framework, wherein the cloud-enabled device architecture features independent or isolated containers, independent policy control and a unified user interface. This device architecture may, for example, be provided by a device agent (or device module) installed on the device that ensures the compliance with the constraints as required by the policies as defined by the community administrators. This manageability framework thus supports multi-tenant management applications for devices, communities and applications.

This cloud platform provides, for example, the following advantages for the cloud-enabled device architecture offered to the end users: (i) the ability to access secure and managed services from a provider (e.g. from an employer, bank or other service provider), while using the same client device for personal use (this eliminates the restriction that a single IT department implements controls for the entire device); (ii) the ability to maintain control over personal data and privacy, while allowing business applications to be managed and monitored by the IT-department responsible for protecting these assets; (iii) the ability to choose personal applications and operating systems and access them concurrently on a single device with different business applications and even operating systems.

On the other hand, for the provider (the community administrator, IT departments, employers, etc.) the cloud platform provides inter alia the following advantages: (i) the provider can manage, monitor and control business-critical applications without having to manage an entire client device of a user; (ii) the provider can securely manage end-to-end communities of users, devices and business applications in an integrated manner, from the data center to their end-users own devices.

Therefore, devices, even end-user personal devices like smart phones, may be managed by an operator or service provider—at least in so far as it is required by the applied policies—while applications are managed by software suppliers, third parties or organizations providing applications for a specific community. Therefore, embodiments provide a simple control of what applications should be deployed to which users and under which security policies.

On the other hand, on the client's side, the user may still use the device for other purposes without compromising the integrity of the business applications or violating corporate risk management policies while allowing the user to participate in multiple communities from a single device.

This network platform provides as further advantage the possibility that multiple end-to-end isolated communities can be managed independently of the physical hardware used on both ends, i.e. on the provider side and on the end-user side, because the hardware-dependent management is decoupled from the application- and community-dependent management. To ensure that the communication between the cloud platform and the various possible client devices (as for example, PC, tablet, smart phone . . . ) is carried out in the intended way, the client devices/computing environments may have the client side management agent installed which provides an integrated cloud-based management of the base client software, along with end-user community registration and associated application and security policy deployment.

The particular community policies to be enforced may, for example, be defined by the community administrator and rely on containment technology on the client side and on a trust model on the cloud platform side or the provider side to provide the cloud platform back end with secure control of the client system software and a management agent. Therefore, a module as the client site management agent will be installed on the client device/computing environment, thereby allowing multiple independent community administrators to trust the cloud platform for enforcing multi-tenancy all the way to the end-user devices, for isolating community applications, and for enforcing the respective policies. The installed agent on the user device/computing environment handles secure communications with the cloud platform and, in addition, manages user rights, controls containerization of community applications and configures the appropriate policy enforcement points to enforce domain-wide as well as individual community policies. In addition, in further examples the cloud platform is designed to allow a secure distributed deployment of a management back-end for an individual community (e.g. inside an enterprise), for those scenarios where such flexibility may be required.

FIG. 1 depicts a network system 100 for implementing a cloud platform connected to a network 200 to which at least one device 205, 207, has access is connected, wherein on each of the devices 205, 207, one or more computing environments 206a, 206b for particular purposes are implemented. The plurality of the user devices 205, 207, are connected to the network 200 by a permanent or temporal communication link, wherein the network 200 (e.g. the internet, mobile phone network, etc.) is configured to provide a connection to the network system 100. On a given user device 205, the one or more computing environments 206a, 206b, are installed, wherein the different computing environments 206a, 206b, may be employed in different contexts (e.g. providing different security levels) or for connecting to different communities in the network system 100.

The network system 100 further comprises an application management module 110 to enable access to one or more abstract applications 112, 114, wherein each abstract application 112 is associated with one or more concrete applications 113a, 113b, defining implementations of the one or more abstract applications 112 for the one or more computing environments 206a, 206b, on the user device 205 (e.g. the respective application binaries). The access to the abstract application 112 may include the access to at least one concrete application 113. The application management module 110 may further allow the manipulation of application abstractions at the cloud platform level. For example, an office application is one application which can have different concrete applications (e.g. binaries) depending on the device type (smartphone, tablet, PC, . . . ) and the device operating system (e.g. iOS, Android, Linux, Windows, . . . ), and policy requirements (location, trust level, sensitivity of data that will be operated on, etc.). For example—if a corresponding application exists for the device and the operating system and if the policy conditions are met then the corresponding application can be installed on the device. However, if a certain condition is not met then a remotely hosted version can be made available or if a set of conditions are not met, then the access can be denied. Therefore, if the abstract application 112 is such an office application each of the concrete application may be defined as the various implementations of this office application for various operating systems and/or various hardware devices.

In addition, the application management module 110 may also be configured to orchestrate access to, and the operation of, a set of applications. For example, the application management module 110 may support the management of various types of applications and the network system 100 may be configured to support and federate many such management modules for the various types of applications.

In addition, the network system 100 comprises a community management module 120 which is configured to manage one or more communities 122a, 120b, . . . , each community 122 is defined at least by the one or more abstract applications 112 and a set of user credentials (e.g., a user ID, user name, role of the user, etc.). The access of the user to the abstract application 112 is subject that one or more provisions are met, which are defined for each community 122 and are selected from a group comprising one or more policies, management processes, and services. Furthermore, the community management module 120 allows the definition of a set of (abstracted) applications 112, the users that should have access to them, and the policies under which they should be made accessible (security, IT management, processes, etc. . . . ). Thus, each community 122 may be defined as a managed set of applications.

Moreover, the network system 100 comprises a user enrollment portal 130 which is configured to support the enrolment (or registration) of the user in at least one community 122 from the device 205 (or the computing environment 206) and to orchestrate or enable a policy management mechanism to support an enforcement of the one or more policies under which the user has access to the abstract application 112 from the device 205 (or from the computing environment 206). The enrolment portal 130 may upon a community access request from the user from the particular device 205 (or the computing environment 206) map that community's policies to the use of specific policy management modules to enforce those policies on that user's device 205 (or the computing environment 206). This may imply to use particular device management software, or an application container management, or other constraints depending on policy requirements.

The enrolment portal 130 may comprise a device connector component to establish the network connection from the device 205 to the network system 100. The device connector may identify the type of devices and feeds this information to a community policy engine.

The network system 100 may, optionally, be connected to an external storage 310 to store the one or more concrete applications 113 associated with the abstract application 112. Moreover, the network system 100 may, optionally, be connected to one or more community administrators 320, which, upon a further enrolment, connect to the community management module 120 to manage the at least one community 122. For example, at least one community administrator 320a is associated with one particular community 122a to define policies for a respective abstract application 112, management processes, and services related to this particular community 120a without managing the concrete applications 113 or the hardware used by the user.

Therefore, the network system 100 may be configured to enable access to one or more concrete applications 113 and to define one or more policies, wherein the one or more policies may be fixed for the abstract application 112, but vary for concrete applications 113 associated with the particular abstract application 112. For example, when a particular user uses different devices or different computing environments (e.g. different operating systems), he might be allowed to get access to different concrete applications and, in addition, different policies may be applied to the same user.

In detail, when the client (user) uses a particular computing environment 206a on the device 205 to connect to the network system 100 via the network 200, it will be connected to the user enrolment portal 130. The enrolment portal 130 may identify the user (for example, based on the user credentials that might be stored on the enrolment portal 130) and the particular computing environment 206a. This information may be provided to the community management module 120, which in turn may impose policies to be enforced on the user based upon the user credential and/or the computing environment 206 and/or the particular context. The particular context may relate to the time, place or used type of connection to the device 205 (e.g. wireless or not). The community management module 120 may forward policies to be imposed to the application management module 110, which itself allows access to a particular concrete application 113a associated with the particular computing environment 206a of the user. This access is only provided under the policies imposed by the community management module 120. As result, the user may download or access the particular concrete application 113a corresponding to its particular computing environment 206a via the user enrolment portal 130 or, optionally, via a separate network connection (not shown in FIG. 1), and may invoke the application only under the particular policy identified by the community management module 120 (e.g. to use particular software on the user device 205/computing environment 206).

In further examples, the policy to be enforced depends on the computing environment 206 identified by said enrolment portal 130 so that, when the user uses a different computing environment, a different policy from said plurality of policies is enforced. This may imply that the user enrolment portal 130 may vary the policies to be enforced base upon the computing environment 206 (or the particular device 205) the user uses for accessing the network system 100. For example, if the user uses Web browser environment on a smart phone being connected via a public mobile phone network, the access to remote resources may be more restricted, than if the same user uses a virtual software environment within a secure network environment. Therefore, the user enrolment portal 130 and/or the policy management module may be configured to adjust, for a given user, the one or more policies to the computing environment 206 (or device) used by the given user.

In further embodiments the concrete applications 113 are downloaded from an external storage 310 via the network system 100. In addition, the network system 100 may comprise several access terminals. For example, one of them may be used by the user enrolment portal 130 to enroll the user and identify the user and its computing environment 206, and another one is used to get access to the concrete application 113 after having mapped the policies under which this particular concrete application 113 can be supplied to the user for the particular computing environment 206.

Figure 2:
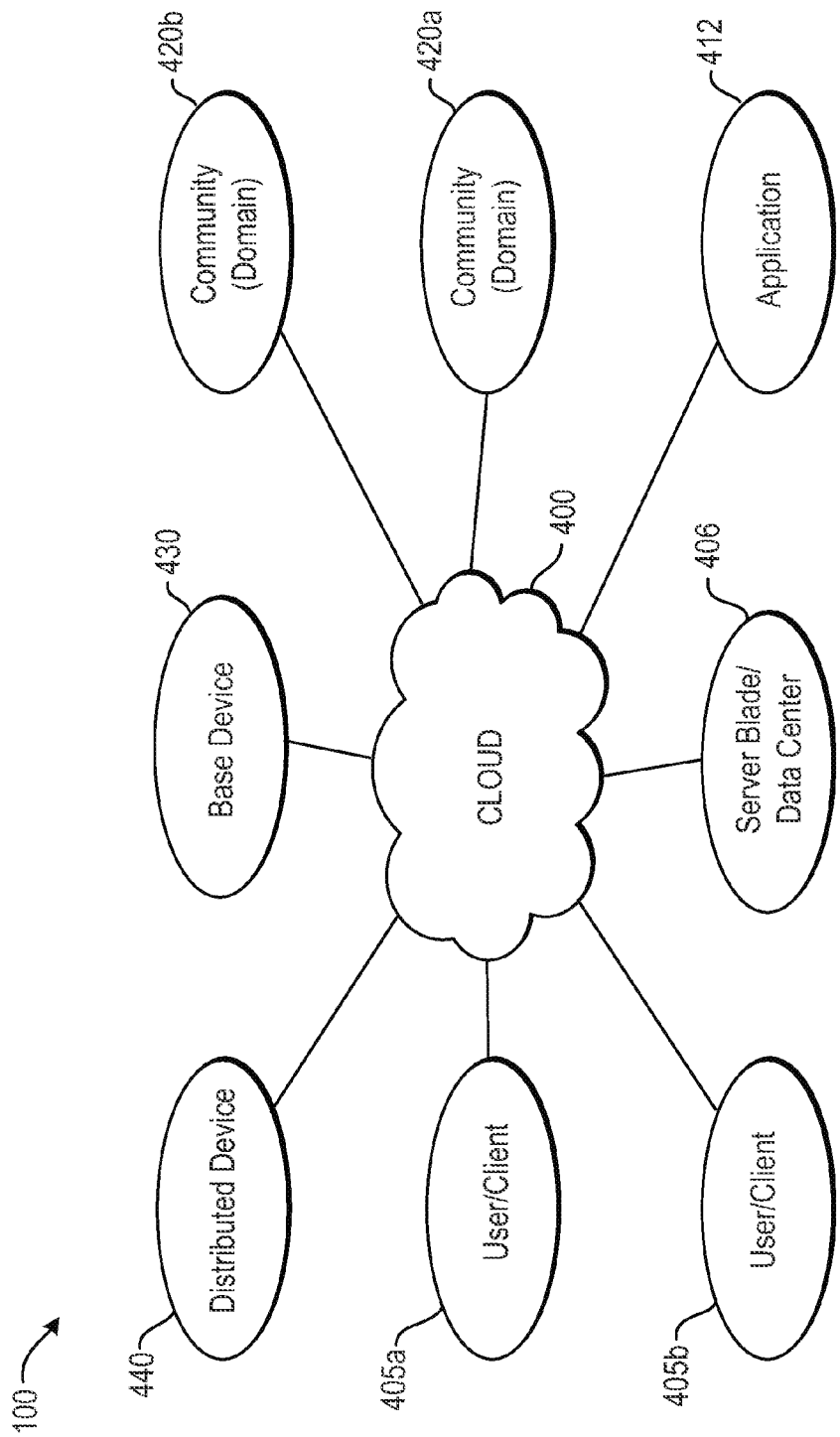
FIG. 2 demonstrates a cloud environment used by various clients.

FIG. 2 demonstrates a cloud concept, wherein the cloud 400 provides connectivity for several user devices/communities. For example, the cloud 400 may be connected to user clients 405*a*, 405*b*, to a server blade/data center 406, applications 412, communities (domains) 420*a*, 420*b*, a base device 430 and a distributed device 440. In a cloud platform the multiple users (tenants) may share a common infrastructure and/or platform and/or service/applications, wherein each entity independently manages its own footprint on a device whose resources are shared with other entities. For example, a user device may comprise a container (a particular, closed software environment which is protected from other software installed on the device) such that the enclosed software environment is, for example, managed from the community management module 120 (e.g. via the applied policies and the required device software), whereas the software environment outside the container is still managed by the user itself. In a unified notation this personal area may be named as "community 0".

This cloud concept is realized in embodiments in that users can enroll themselves in a managed domain and create their user accounts, which allows them to log-in to their client device, and hence into the domain, and browse a catalogue of available communities. The users may join communities they might be interested in and have authentication credentials for. Moreover, a domain administrator can easily pre-register users and their devices/computing environment to mandatory communities and applications. In further embodiments, the special unmanaged "community 0" supports the user's personal domain that provides a similar experience a user would expect on a typical personal device (personal appstore, personal OS, . . . ) outside of the control of the cloud platform. The community administrator may, moreover, allow the domain to enable simple-sign-on for user to access community applications based on their domain authentication, rather than having to re-authenticate every time against the specific enterprise directory of the community or the user management system.

Figure 3A:
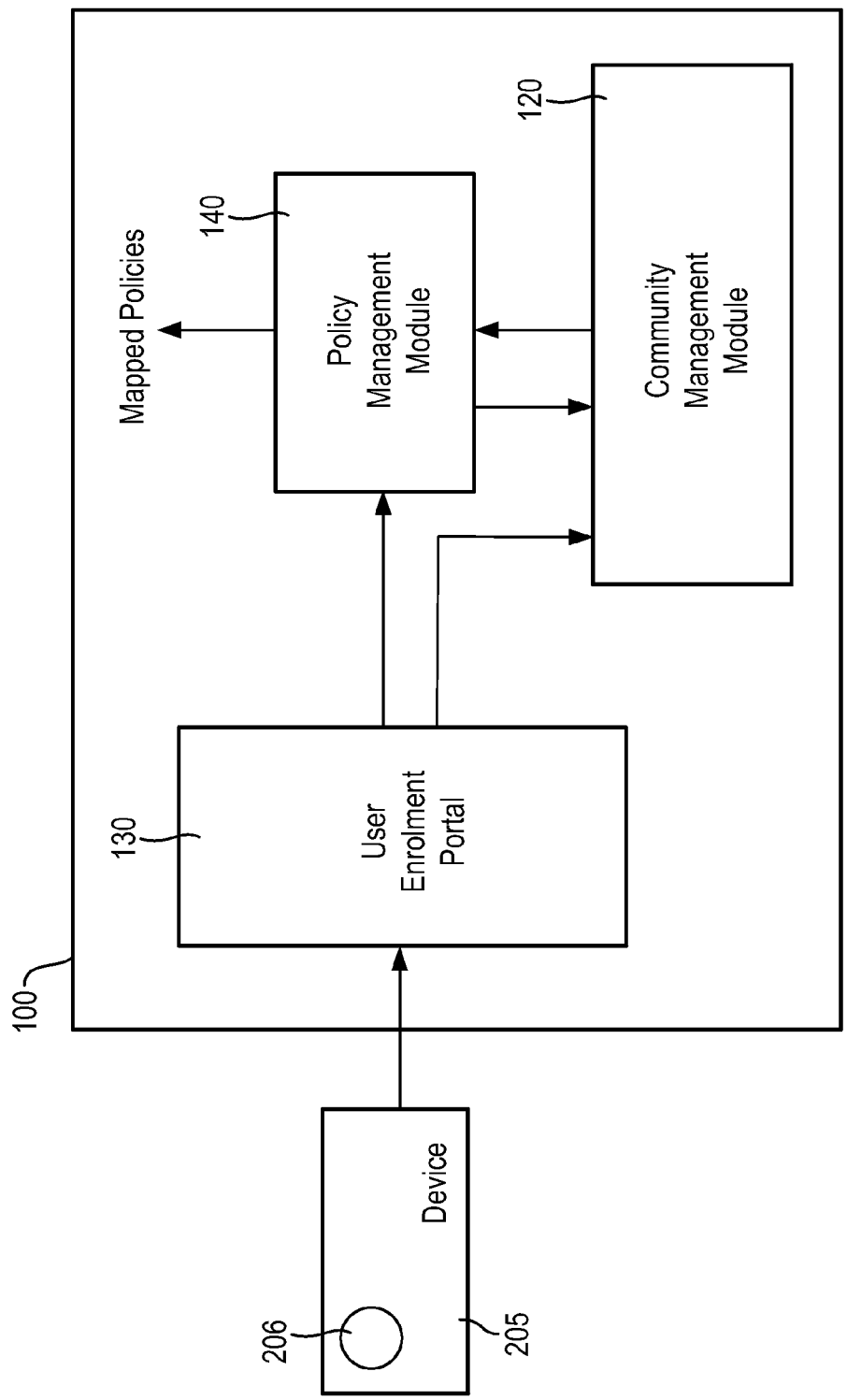
FIGS. 3a-c depict further components according to further embodiments.
Figure 3B:
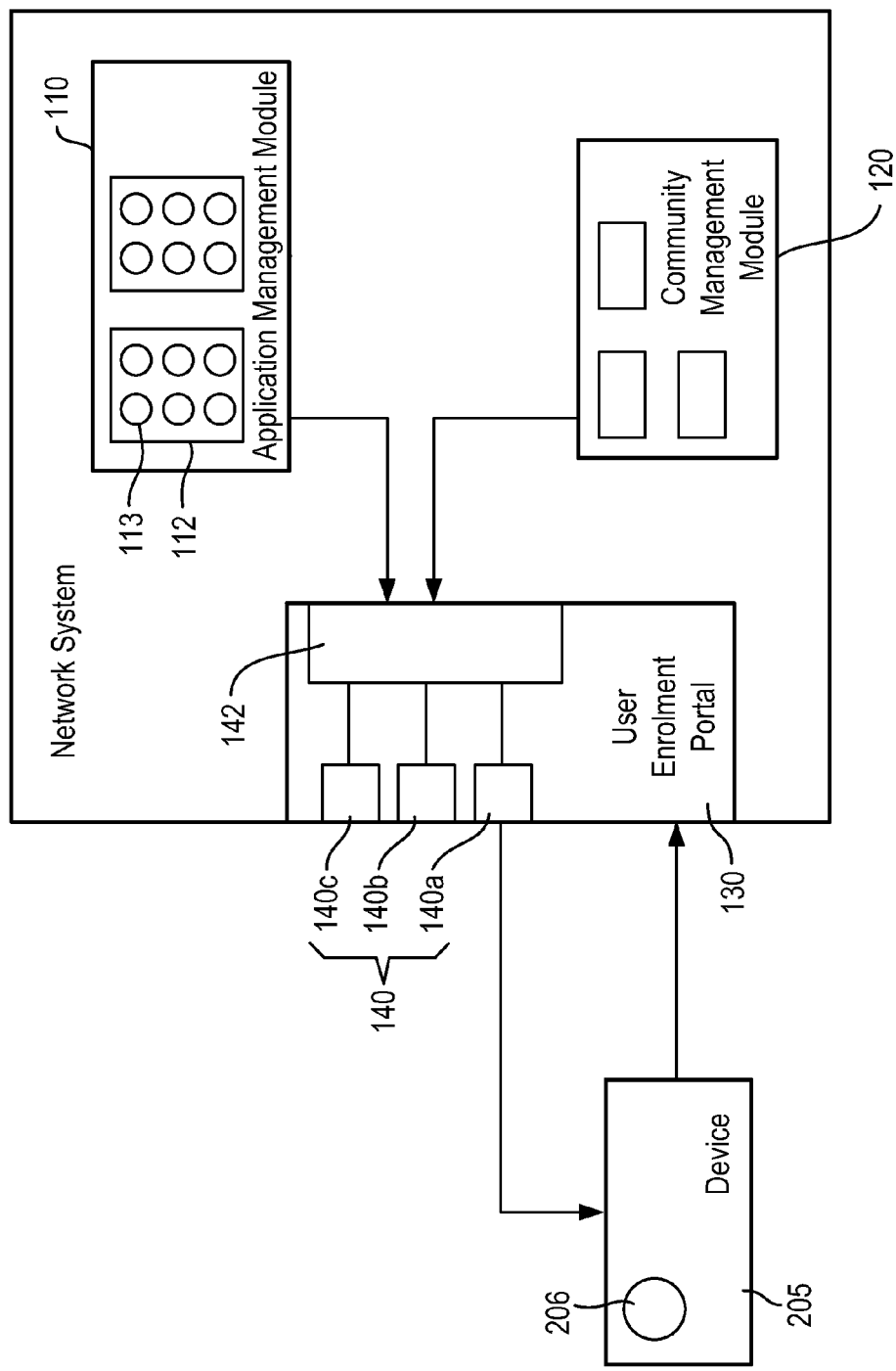
Figure 3C:
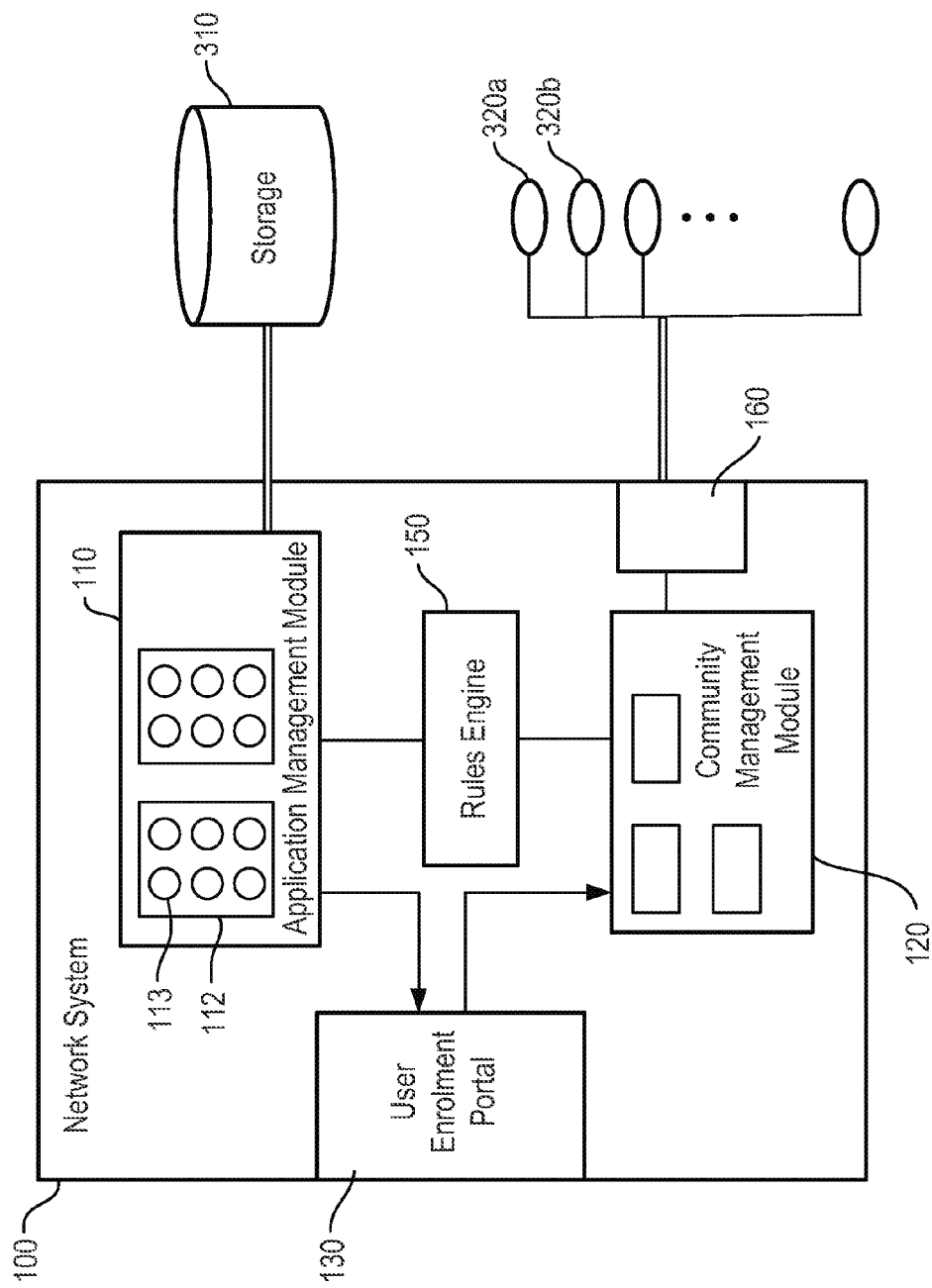

FIGS. 3*a*-*c* depict further embodiments with further optional components, which may be combined with any features and components descript before (not all components of the network system 100 are depicted in FIGS. 3*a*, *b*, *c*).

In FIG. 3*a*, the user device 205 is using a particular computing environment 206 to enroll with the enrolment portal 130. The network system 100 comprises in this embodiment a further policy management module 140 (only part of the network system is depicted). After the enrolment of the user with the enrolment portal 130, the policy management module is notified about the user and the computing environment 206. The policy management module may request from the community management module 120 information about the applied policy or management processes or allowed services for the user using the particular computing environment 206. After having received this information, the policy management module 140 maps the one or more policies to be enforced on behalf of the community on the user. As result, the user gets access to the requested concrete application 113 only under the policies as imposed by the community management module 120. These mapped policies are, for example, transmitted to the application management module 110 which provides access to the respective concrete applications to the user under the mapped policies.

Therefore, in further embodiments the user enrolment portal 130 is configured to identify the computing environment 206 used by the user to get access to the network system 100, and the user enrolment portal 130 is further configured to notify the policy management module 140 about the identified computing environment 206, and the policy management module 140 is configured to map the policy to be enforced on behalf of the community using the identified computing environment 206.

FIG. 3*b* illustrates a further embodiment, wherein this mapping is performed by a mapping module 142 being part of the user enrolment portal 130.

In this example, the policy management is performed in the user enrolment portal 130, which comprises a plurality of policy management modules 140*a*, 140*b*, . . . and a mapping module 142. The mapping module 142 is connectable to the community management module 120 to receive respective instructions for defining the mapping of specific policies to particular users (or user credentials) or to user devices 205 or to computing environments 206. This mapping is implemented by assigning a specific policy management modules 140*a* to be used for the user device 205/computing environment 206 to get access to the concrete application 113 provided by the application management module 110.

Therefore, in this embodiment the user connects to the network system 100 from its device 205 by using the computer environment 206 and enrolls with the user enrolment portal 130. The user enrolment portal 130 identifies the user and its computing environment 206 and provides access to the requested concrete application 113 only via a particular policy management module 140*a*, which is identified by the mapping module 142. This particular policy management module 140*a* ensures the enforcement of the policies as defined by the community management module 120 on the user device 205. Therefore, the community management module 120 or the respective community administrators 320 define the policies to be enforced for the abstract application 112 and submits this information to the mapping module 142 which maps these policies onto the respective concrete applications 113 and the respective users. As a result, if the particular user gets access to the user enrolment portal 130, the user will get access to the concrete application 113 only via the particular policy management module 140a, which is connected to the application module 110 and provides not only the concrete application for the computing environment 206, but enforces also the policies to be applied.

FIG. 3c depicts further embodiments, wherein the network system 100 comprises an optional rules engine 150 and/or an optional community administrator portal 160.

The rules engine 150 is configured to manage entitlements to the concrete applications under a predetermined policy according to one of the following: the user credential, the device 205 and its computing environment 206 and a context of an access request. For example, the user may be entitled to use the particular concrete application 113 or to enable particular functions of the concrete application 113 dependent on its position within a company or dependent upon a used particular computing environment 206a or a particular user device 205. For example, these particular functions include one or more of the following: to access particular data bases or to store or print particular data locally or remotely or other actions (e.g. to allow financial transactions) to be performed by the user using the user device 205 within the computing environment 206.

The rules engine 150 may also be part of the user enrolment portal 130 or the policy management module 140. For example, if the user enrolment portal 130 comprises a device connector, this device connector may act as the rules engine 150.

The community administrator portal 160 is configured to allow individual community administrators 320a, 320b, . . . to define the one or more policies and/or to view a community dashboard. For this, the community administrator portal 160 provides access to the community management module 120. The defined community policies may be associated to applications and particular users by the respective community administrator 320a. The dashboard represents, for example, the state of operation/use/security posture of their community.

The abstract/concrete applications 112 may comprise private applications made available only within one community 122 and public applications 112 made available for multiple communities. These applications may be listed in a catalogue to one or more the community administrators 320.

Due to the decoupling of the application management and the device management, the community administrators 320 do not have to deal with the various user devices 205, 207, . . . or with the various concrete applications 113a, 113b, . . . for the different computing environments 206a, 206b, . . . . . Instead, they may only need to identify the policies based upon criteria as the user, their role, the used device or the used computing environment, while delegating the respective consequences for the device-dependent enforcement of these policies and the particular concrete application to be used to the other components in the network system 100 (i.e. the user enrolment portal 130 and the application management module 110).

Further embodiments comprise also an encryption module (not shown) to provide a secure, encrypted connection to the user devices 205/computing environments 206 and/or to the community administrators 320. As part of the enforced policies the community administrator 230 may impose a predetermined level of encryption being enabled on the user device 205/computing environment or at least a predetermined encryption is turned on. The enforced policies may further comprise that active intrusion prevention is deployed, and that the device is operated on behalf of the community for community applications alone.

In further embodiments, the user enrolment portal 130 is configured to enrol the user with said multiple communities and/or to enrol the user from multiple types of devices or computing environments. Optionally, the user enrolment portal 130 is further configured to provide access to the abstract application 112 only if the device/computing environment can ensure that the one more policies are enforced on the device/computing environment or, if not, to deny access or to provide only limited access, wherein particular functions are disabled (e.g. no access to particular information, no transactions are allowed).

The user enrolment portal 130 may further comprise a module to manage the computing environment 206 which is configured to provide at least one of the following: issue a set of user credentials (e.g. a user identifier as the user name, role of the user), manage the set of user credentials, manage profiles of different devices/computing environment, and register the user. In further examples the user credentials may be managed by the community management module 120.

After enrolment, the user enrolment portal 130 may further be configured to present the user with a selection (e.g. a list) of the plurality of communities 122 to be accessed by the user under policies imposed by the community administrator 320. Therefore, the user may enrol for one or more communities 122 from a single device 205/computing environment 206 in that the user select the particular community 122a from the list to enrol for this particular community 122a.

Further embodiments relate to a network system 110, wherein the application management module 110, the community management module 120 and the user enrolment portal 130 are implemented on separate computing devices connected to each other by the network 200 or a different network. The different network may also be a public network as the internet, but may also be defined by a closed, particular secured network environment. This separation is made possible, because embodiments of the present invention define a decoupling between the respective functions so that the respective management and enforcement functions are delegated on different modules, which may even run under different operating systems and/or in different computing environments (e.g. they may be spatially separated).

For example, the function of providing an application management may fall within the responsibility of an application provider, the function of a community management may fall within the responsibility of a content provider or a plurality of independent content provides, and the function of a device management may fall within the responsibility of a device manager managing the network system 100. Each of these different management functions is performed in an independent and decoupled way and will only be connected insofar as the respective information or data or policies are supplied from one component (or module) to the other components of the network system 100 as needed. On the other hand, the cloud platform should provide a protected environment, i.e. there may be some amount of integration to allow this data and policies to be exchanged securely between the different components.

Embodiments relate also to a device comprising a device module being configured to provide a connection to the network system 100 as described before to get access to the concrete application 113, and to enforce the one or more policies on the device 205. The device module may include or provide one or more computing environments as application containers to support for example Web applications, native applications, virtual machines or virtual appliances, or even firmware application. The computing environments may also be loaded before access to the concrete application is granted. For example, a virtualization software environment may be required to enforce policies over an application that would be an Operating System image or a virtual appliance. Optionally, an application may also be packed with its own mechanisms to ensure the community policy is enforced. Optionally, the device may get access to the concrete application only remotely in that the concrete application is run on a remote computing device so that the computing environment for the concrete application is provided by this remote computing device.

In addition, the user may enrol in parallel to multiple communities and the enforced policies may ensure that the multiple communities can operate independently—e.g. in that sufficiently secure container have to be provided by the different computing environments.

In addition, the network system may optionally be configured to enforce simultaneously one or more policies for multiple communities on a given device. Therefore, the user may enrol for different communities at the same time or subsequently and the network system (e.g. the enrolment portal) will ensure that each of the respective policies for the multiple communities are properly enforced on the given device with one or more computing environments. If the device cannot ensure this, the network system may deny the enrolment to one or more communities or deny the access of the device completely.

In further embodiments one or more top communities may comprise one or more sub-communities, wherein certain abstract applications may be made available for all sub-communities whereas other applications may be restricted only to one or more sub-communities. In addition, one or more abstract applications may be defined for the top community. For example, a larger organization comprising various departments may establish one top community with various sub-communities associated with the various departments, each subcommunity may have its own specific application, which is accessible via the application of the top community.

Figure 4:
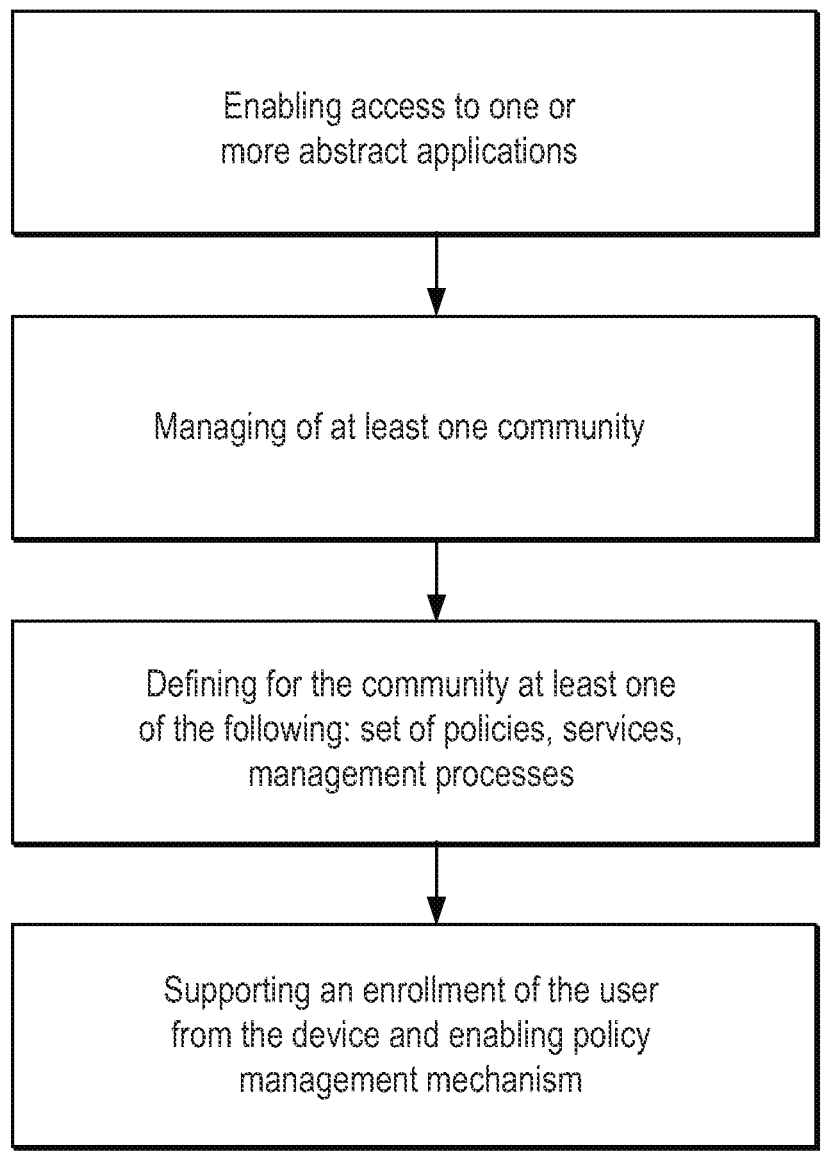
FIG. 4 shows a flow diagram implementing a method according to an embodiment.

FIG. 4 depicts a flow diagram, showing an embodiment of steps for implementing the method on a cloud platform within a network 200 to which the at least one device 205, defining one or more computing environments 206 for a user has access. This method comprises enabling access to a plurality of abstract applications 112, wherein each abstract application 112 is associated with one or more concrete applications 113 defining implementations of the abstract application 112 for the one or more computer environments 206. In addition, the method comprises managing of at least one community 122, wherein each community 122 comprised of at least a set of user credentials and a set of abstract applications 112. The method further comprises the step of defining, for the community, at least one of the following: a set of policies, management processes, and services, under which said abstract applications 112 can be accessed by the user. The method further comprises the step of supporting an enrolment of the user from the device 205 and orchestrating an appropriate policy management mechanism to support an enforcement of the set of policies under which the user has access to the concrete applications 113 from the device 205.

Depending on certain implementation requirements of the inventive methods, the inventive methods can be implemented in hardware or in software. The implementation can be performed using a digital storage medium, in particular a disk or a CD having electronically readable control signals stored thereon, which cooperate with a programmable computer system such that the inventive methods are performed. Generally, the present invention is, therefore, a computer program product with a program code stored on a machine readable carrier, the program code being operative for performing the inventive methods when the computer program product runs on a computer. In other words, the inventive methods are, therefore, a computer program having a program code for performing at least one of the inventive methods when the computer program runs on a computer.

Figure 5:
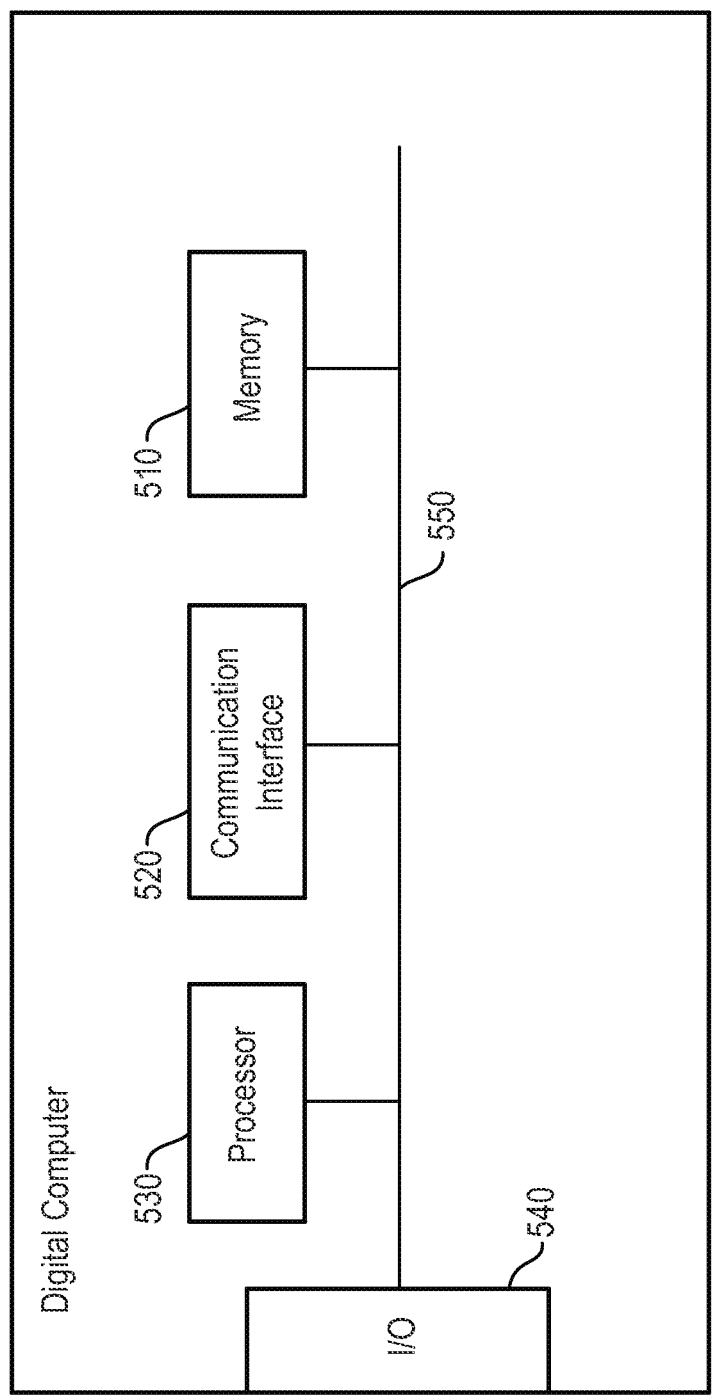
FIG. 5 shows a block diagram illustrating a computing device for implementing at least part of the inventive concept.

FIG. 5 depicts a digital computer as an example of such a hardware comprising an internal memory 510, a communication interface 520, a processor 530 and at least one input/output device 540, wherein these components are connected by a local bus 550. The computing device 500 is configured to load software code portions from the computer program product directly into the internal memory 510 of the digital computer to perform the method steps as depicted in FIG. 4.

In summary, various embodiments of the present invention provide a decoupling of the management of individual client devices (and their system software) from the management of which applications should be available to what users under what policies. This allows multiple independent community or IT administrators to each control their own policies (and thus providing a security management) over their own applications (possibly managed by third parties), even on a user device which is not managed by any one of them.

By separating the management of applications and associated policies from the management of a device on which they will become available, the inventive decoupled client management allows to design solutions that can seamlessly manage the deployment of the right application binaries and configurations to the right type of device according to policy, without exposing that complexity to the IT-administrator (owner of the applications), but whilst allowing them to maintain control policy.

The embodiments described above and the accompanying drawing merely serve to illustrate the subject matter of the present invention and the beneficial effects associated therewith, and should not be understood to imply any limitation. The features of the invention, which are disclosed in the description, claims and drawings, may be relevant to the realization of the invention, both individually and in any combination.

The invention claimed is:

1. A method, comprising:
   receiving a request, by a system including a processor, across a network from a client device for access to a particular community of a plurality of communities, the particular community including an abstract application and a policy corresponding to the abstract application, the abstract application implemented by each of multiple concrete applications, and the policy specifying which concrete application for the abstract application is to be provided to the client device;
   identifying, by the system, a computing environment of the client device;
   based on the identified computing environment, selecting, by the system, a concrete application of the multiple concrete applications associated with the abstract application; and
   allowing, by the system, access to the selected concrete application by the client device in accordance with the policy.

2. The method of claim 1, wherein identifying the computing environment of the client device comprises identifying which of a plurality of different computing environments is in use at the client device.

3. The method of claim 2, further comprising:
selecting, by the system, different policies to use for the different computing environments of the client device, wherein the different policies specify different conditions under which the client device has access to the abstract application.

4. The method of claim 1, further comprising:
presenting, by the system, at the client device a list of the plurality of communities for selection; and
receiving, by the system from the client device, user selection of the particular community from among the plurality of communities.

5. The method of claim 1, wherein each community of the plurality of communities is defined by a respective set of one or multiple abstract applications, and a set of user credentials.

6. The method of claim 1, wherein allowing the access of the selected concrete application comprises downloading the selected concrete application to the client device.

7. The method of claim 6, further comprising:
downloading, by the system to the client device, another concrete application associated with a different abstract application of a different community based on a different policy associated with the different community, the downloading of concrete applications associated with different abstract applications providing the client device with a plurality of concrete applications associated with different communities in accordance with different policies.

8. The method of claim 1, wherein the system is part of a cloud platform that includes entities to control access to abstract applications in respective communities.

9. The method of claim 1, further comprising:
enrolling, by the system, the client device in parallel in multiple communities of the plurality of communities.

10. A client device comprising:
a communication interface to communicate over a network with a network system; and
at least one processor to:
execute a particular computing environment of a plurality of computing environments in the client device;
connect, to the network system, using the particular computing environment;
send, to the network system, a request over the network for access to a particular community of a plurality of communities, the particular community including an abstract application and a policy corresponding to the abstract application, the abstract application implemented by each of multiple concrete applications, and the policy specifying which concrete application for the abstract application is to be provided to the client device; and
download, from the network system, a concrete application of the multiple concrete applications, the downloaded concrete application identified by the network system for the particular computing environment based on selection from among the multiple concrete applications according to the policy of the particular community that specifies that different concrete applications of the multiple concrete applications are downloaded for different computing environments.

11. The client device of claim 10, wherein the at least one processor is to:
present, based on interaction with the network system, a list of the plurality of communities for selection; and
send, to the network system, user selection of the particular community from among the plurality of communities.

12. The client device of claim 10 wherein each community of the plurality of communities is defined by a respective set of one or multiple abstract applications, and a set of user credentials.

13. The client device of claim 10, wherein the at least one processor is to further:
download, from the network system, another concrete application associated with a different abstract application of a different community based on a different policy associated with the different community, the downloading of concrete applications associated with different abstract applications providing the client device with a plurality of concrete applications associated with different communities in accordance with different policies.

14. A network system comprising:
a communication interface to communicate over a network with a client device; and
at least one processor to:
receive a request, over the network from the client device, for access to a particular community of a plurality of communities, the particular community including an abstract application and a policy corresponding to the abstract application, the abstract application implemented by each of multiple concrete applications, and the policy specifying which concrete application for the abstract application is to be provided to the client device;
identify a computing environment of the client device;
based on the identified computing environment, select a concrete application of the multiple concrete applications associated with the abstract application; and
allow access to the selected concrete application by the client device in accordance with the policy.

15. The network system of claim 14, wherein the identifying of the computing environment of the client device comprises identifying which of a plurality of different computing environments is in use at the client device.

16. The network system of claim 15, wherein the at least one processor is to further:
select different policies to use for the different computing environments of the client device, wherein the different policies specify different conditions under which the client device has access to the abstract application.

17. The network system of claim 14, wherein the at least one processor is to further:
present at the client device a list of the plurality of communities for selection; and
receive, from the client device, user selection of the particular community from among the plurality of communities.

18. The network system of claim 14, wherein each community of the plurality of communities is defined by a respective set of one or multiple abstract applications, and a set of user credentials.

19. The network system of claim 14, wherein the allowing of the access to the selected concrete application comprises downloading the selected concrete application to the client device.

20. The network system of claim 19, wherein the at least one processor is to further:

download, to the client device, another concrete application associated with a different abstract application of a different community based on a different policy associated with the different community, the downloading of concrete applications associated with different abstract applications providing the client device with a plurality of concrete applications associated with different communities in accordance with different policies.

* * * * *